(12) United States Patent
Stephens et al.

(10) Patent No.: US 7,436,780 B2
(45) Date of Patent: Oct. 14, 2008

(54) METHOD AND APPARATUS FOR APPROXIMATING LOCATION OF NODE ATTACHED TO A NETWORK

(75) Inventors: Spencer Stephens, Toluca Lake, CA (US); Christopher Cookson, Studio City, CA (US); Chuck Dages, Los Angeles, CA (US)

(73) Assignee: Time Warner, Inc., New York, NY (US)

( * ) Notice: Subject to any disclaimer, the term of this patent is extended or adjusted under 35 U.S.C. 154(b) by 841 days.

(21) Appl. No.: 10/739,889

(22) Filed: Dec. 17, 2003

(65) Prior Publication Data

US 2005/0135257 A1   Jun. 23, 2005

(51) Int. Cl.
*H04L 12/26* (2006.01)
(52) U.S. Cl. ..................... 370/252; 370/389
(58) Field of Classification Search ........... 370/218, 370/229, 232, 235, 247, 324, 241, 252, 245, 370/253, 254, 248, 255, 238, 346, 389, 390, 370/400, 432; 709/224; 455/404.2, 456.1, 455/456.6
See application file for complete search history.

(56) References Cited

U.S. PATENT DOCUMENTS

| | | | |
|---|---|---|---|
| 5,521,907 A * | 5/1996 | Ennis, Jr. et al. ............ 370/253 |
| 6,108,558 A * | 8/2000 | Vanderspool, II ......... 455/456.2 |
| 6,169,903 B1 * | 1/2001 | Dorenbosch et al. ......... 455/458 |
| 6,654,463 B1 * | 11/2003 | Leonidov et al. ....... 379/406.08 |
| 6,768,730 B1 * | 7/2004 | Whitehill ..................... 370/348 |
| 6,937,569 B1 * | 8/2005 | Sarkar et al. ................. 370/238 |
| 7,072,305 B1 * | 7/2006 | Gregson ..................... 370/241 |
| 2001/0053699 A1 * | 12/2001 | McCrady et al. ............ 455/513 |
| 2003/0195984 A1 * | 10/2003 | Zisapel et al. ............... 709/238 |

OTHER PUBLICATIONS

Author: Marshall Brain & Tom Harris☐☐Title: How GPS Receivers Work☐☐Date: Apr. 16, 2003.*
Title: Trilateration☐☐Publisher: Wikipedia.*
Title: How GPS Receivers Work, Author: Marshall Brain & Tom Harris, Date: Apr. 16, 2003.*
Title: Trilateration, Author: Wikipedia.*

* cited by examiner

*Primary Examiner*—Ricky Ngo
*Assistant Examiner*—Wei-Po Kao
(74) *Attorney, Agent, or Firm*—Thelen Reid Brown Raysman & Steiner LLP

(57) ABSTRACT

A plurality of reference nodes that are attached to the network are correlated with geographic location. Communication latency between the reference nodes are used to approximate the location of a target node once the communication latency from one of the reference nodes to the target node is determined.

18 Claims, 17 Drawing Sheets

METHOD AND APPARATUS FOR APPROXIMATING LOCATION OF NODE ATTACHED TO A NETWORK

BACKGROUND

Computer networking is now a widely accepted means of delivering information. Some of the information delivered through computer networking includes simple data. For example, textual information is commonly delivered to users over wide-area networks. One example of a wide-area network is the Internet. Most users are familiar with the delivery of information that is formatted using a page description language. A web page is a good example of how textual information is formatted using a page description language called hyper-text markup language (HTML).

Now that many computer users are able to access computer networks using high-speed connections, the type of information delivered by computer network is beginning to expand in scope. High-speed access to computer networks is just one of the factors that have influenced the types of information that can now be delivered over a computer network. New compression mechanisms allow efficient delivery of audio and video content over computer networks. For example, audio is now encoded in formats such as "MP3" and video is encoded in formats such as "MPEG-II and MPEG-III", just to name a few.

Information is a very valuable commodity. In many cases, the right to disseminate information belongs to the individual who created the information or a licensee thereof. The use of computer networks to distribute information has many people worried about the enforcement of dissemination rights. For example, many types of information are only intended to be distributed in specific geographic regions. In other cases, the location of a recipient of information can drive taxation and censorship requirements.

A common problem associated with the delivery of information is that of the simple right to distribute information of a particular type in a particular region. For example, one distributor of a particular movie (stored on a computer as an MPEG file, for example) may have only acquired the right to distribute the movie in California. Until now, when an on-line sale occurs, the distributor could only rely on the honesty of a consumer when determining the location of that consumer. Typically, this has been done by querying the consumer, e.g. through an on-line form. The consumer generally fills in a form that indicates the consumer's state or country of residence. Prior method for determining the location of a user are simply too easy to defeat. The distributor in the foregoing example could easily find itself running afoul of its licensing agreements made with the copyright owners of movies it sells on-line.

The problem is even more serious when a distributor needs to base its compliance with local, state and federal regulations and taxation codes. For example, some forms of entertainment content may be entirely banned by a particular sovereign. Consider, for example, adult entertainment or news that is political in nature. This is not so much of a problem in the United States and Europe, but many foreign states recognize political or religious restrictions that result in various forms of censorship. Here in the United States, many states require a distributor to charge sales tax when delivery is made to a consumer within the state. Likewise, consumers not within the state are generally exempt from such sales taxes.

SUMMARY

Presently disclosed is a method and apparatus for approximating the geographic location of a target node attached to a network. According to one example method, communication latencies amongst a plurality of reference nodes are determined. The communication latency between at least one of the reference nodes and the target node determined. A approximate geographic region within which the target node is situated is determined using the measured latency from the reference node to the target node.

BRIEF DESCRIPTION OF THE DRAWINGS

Several alternative embodiments will hereinafter be described in conjunction with the appended drawings and figures, wherein like numerals denote like elements, and in which.

DETAILED DESCRIPTION

Figure 1:
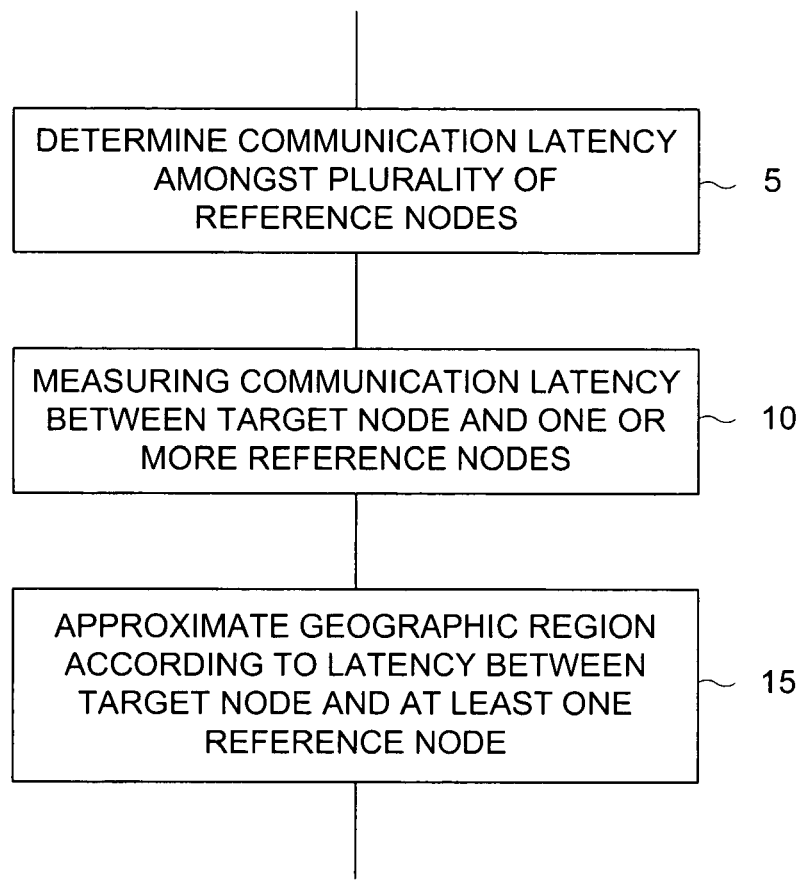
FIG. 1 is a flow diagram that depicts one illustrative method for determining an approximate location of a target node attached to a network.

FIG. 1 is a flow diagram that depicts one illustrative method for determining an approximate location of a target node attached to a network. The network, according to one alternative variation of this method, comprises the Internet. According to this illustrative method, the approximate location of a target node is determined by determining the communication latency amongst a plurality of reference nodes (step 5). Once the communication latency amongst a plurality of reference nodes is determined, the communication latency between a target node and one or more reference nodes is determined (step 10). The target node is estimated to lie in an approximate geographic region that is determined according to the latency between the target node and at least one reference node (step 15).

Figure 1A:
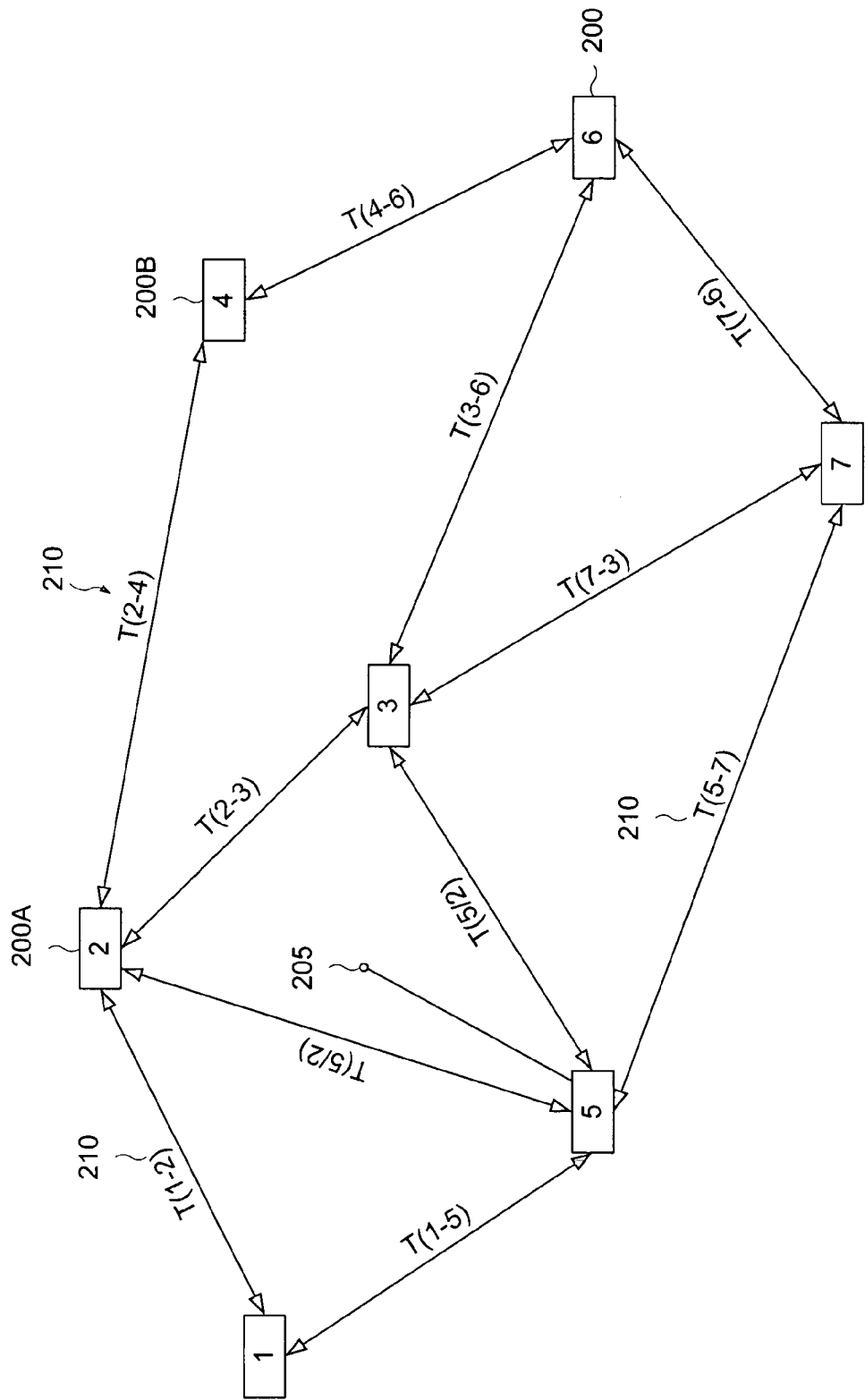
FIG. 1A is a pictorial diagram that depicts a plurality of reference nodes in spatial relation to each other.

FIG. 1A is a pictorial diagram that depicts a plurality of reference nodes in spatial relation to each other. For the purposes of this disclosure, a communication latency between a first reference node 200A and a second reference node 200B is referenced by a designator including an index for the first reference node 200A and the second reference node 200B, e.g. T(2-4). This figure depicts that a plurality of reference nodes are identified according to an index. For example, this figure depicts seven reference nodes, each identified by numerical index 1 through 7. It should be noted that this figure is not intended to limit the scope of the appended claims to any particular number of reference nodes or to any particular means of identifying a particular reference node.

In a typical computer infrastructure, reference nodes will be attached to the computer network at geographical disparate locations. The spatial relationship of each reference node to every other reference node, according to one example method, is represented by a communication latency between the nodes. According to one alternative variation of the present method, communication latency is expressed in terms of time. According to yet another alternative variation of the present method, communication latency is expressed in terms of a "hop count".

Figure 2:
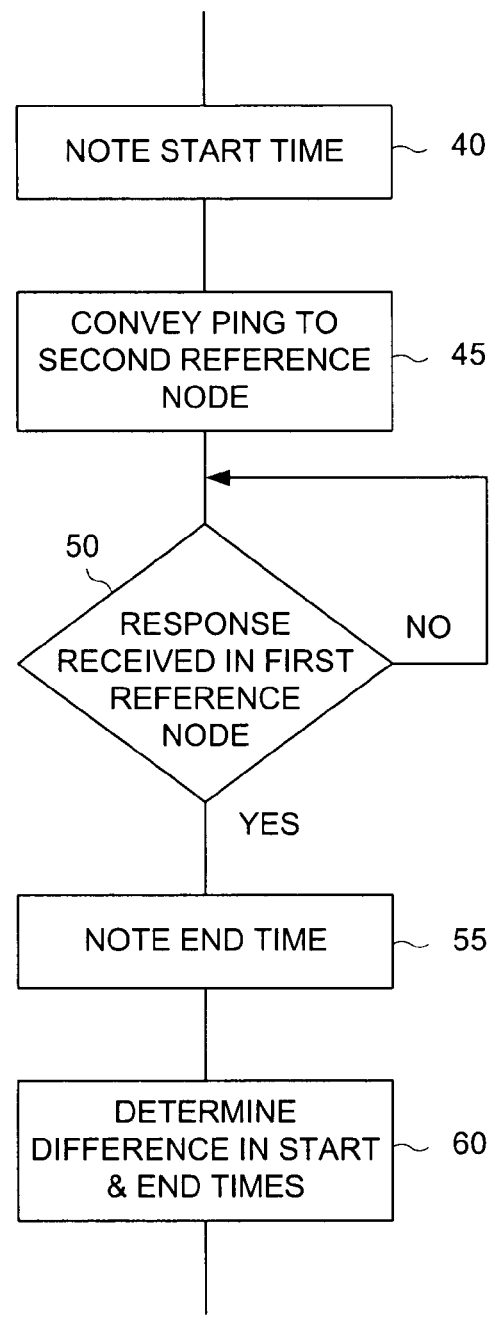
FIG. 2 is a flow diagram that depicts one example method for determining the communication latency amongst a plurality of reference nodes.

FIG. 2 is a flow diagram that depicts one example method for determining the communication latency amongst a plurality of reference nodes. According to this example method, communication latency between a first reference node and a second reference node is determined by noting a "start time" (step 40). Substantially contemporaneously with noting of the start time, a "ping" directive is conveyed to a network (step 45). The ping directive, according to one of variation of the present method, comprises an echo request wherein a package is dispatched from a source node to a particular destination node attached to a computer network. In response to the echo request, the destination node responds with a packet addressed to the source node. According to this example method, when the source node receives a response to the ping directive (step 50), an "end time" is noted (step 55). Accordingly, the latency between the first reference node and the second reference node is determined according to the difference in the start and end times (step 60) that were noted with the dispatch of the ping directive and receipt of a response thereto, respectively. According to yet another variation, the communication latency determined according to the difference in the start and end times is divided by two to reflect the fact that the time between the start and end of the ping sequence heretofore described reflects a round-trip distance between the first reference node and the second reference node. A variation of this method is used to measure the communication latency between a reference node and a target node attached to a network, where an approximate geographic location of the target node is to be determined.

Figure 3:
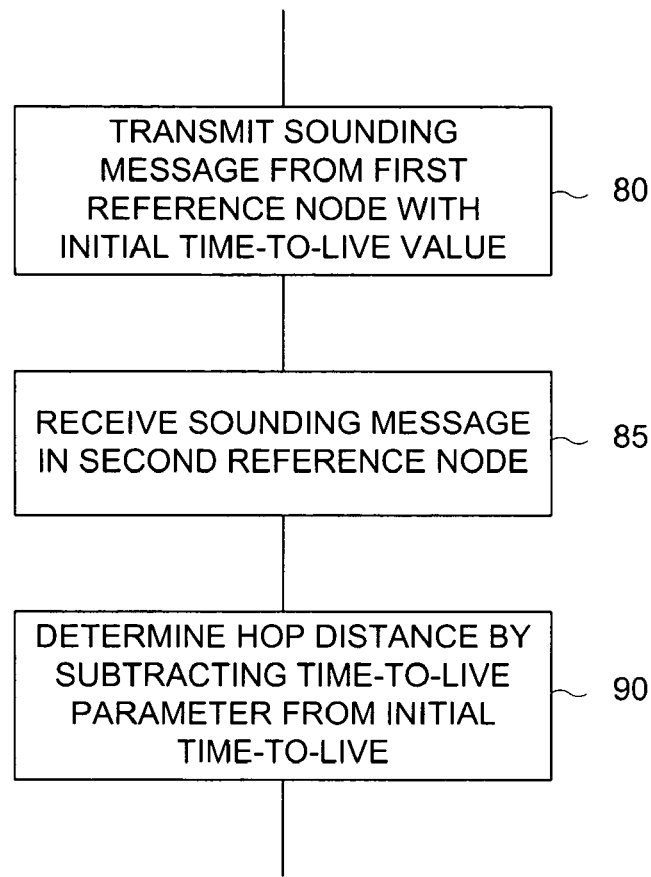
FIG. 3 is a flow diagram that depicts an alternative method for determining the communications latency amongst the plurality of reference nodes.

FIG. 3 is a flow diagram that depicts an alternative method for determining the communications latency amongst the plurality of reference nodes. According to this alternative method, communication latency between a first reference node and a second reference node is determined by transmitting a sounding message from the first reference node to the first reference node (step 80). According to this alternative method, a sounding message includes an initial time-to-live value and a time-to-live protocol parameter. The time-to-live protocol parameter comprises a value included in a set of network protocol information used by a computer network to propagate a data packet from one node to another node across the computer network. Once the sounding message is received in the second reference node (step 85), a hop distance is determined by subtracting the time-to-live parameter from the initial time-to-live value. A variation of this method is used to measure the communication latency between a reference node and a target node attached to a network, where an approximate geographic location of the target node is to be determined.

A common network protocol is the transport control protocol/Internet protocol (TCP/IP). The TCP/IP protocol conveys data packets using information included in a protocol header. Information in the protocol header varies according to a hierarchical model known as a "protocol stack". At the most rudimentary level of this protocol stack is a media access layer known as the "link layer". At the link layer, physical addresses are used to communicate a data packet from one node to another. Immediately above the link layer is the "network layer". The network layer uses logical addresses for devices attached to a network as a means for routing data packets from one node to another. Within this network layer, the TCP/IP protocol provides for an IP header that includes a time-to-live protocol parameter. The time-to-live protocol parameter was originally intended to be used as a timer that specified how long (in seconds) a data packet was to be maintained by a networking infrastructure.

A networking infrastructure typically includes routers and other devices that direct a data packet to a destination node using the logical and physical addresses included in the network and link layers of the protocol stack. Occasionally, a data packet may end up in a circular path as it is passed from one routing device to another. Each time a data packet is passed through a router or other network devices that direct a data packet to a destination node, the time-to-live protocol parameter is decremented. As a result, the time-to-live protocol parameter is now considered to be a maximum "hop count" and can be used to limit the number of times a data packet is forwarded by a router or other data packet directing device included in the networking infrastructure. A data packet having a time-to-live protocol parameter equal to zero that arrives at a router is dropped from the networking infrastructure. Although the time-to-live protocol parameter is defined by the TCP/IP protocol, other networking protocols provide analogous mechanisms to preclude circular routing of data packets within a network infrastructure. Accordingly, the claims attended hereto or not intended to be limited in application to the TCP/IP protocol or any other protocol herein reference.

According to one variation of the present method, an initial time-to-live value is included in a data packet routed through a network infrastructure according to a network protocol. Generally, the initial time-to-live value is set according to the time-to-live protocol parameter included in packet headers associated with a data packet. The time-to-live protocol parameter is ordinarily maintained by networking software executing in a node attached to the network. This parameter, according to one variation of the present method, is obtained from the networking software and included in the data packet as an initial time-to-live value.

Figure 4:
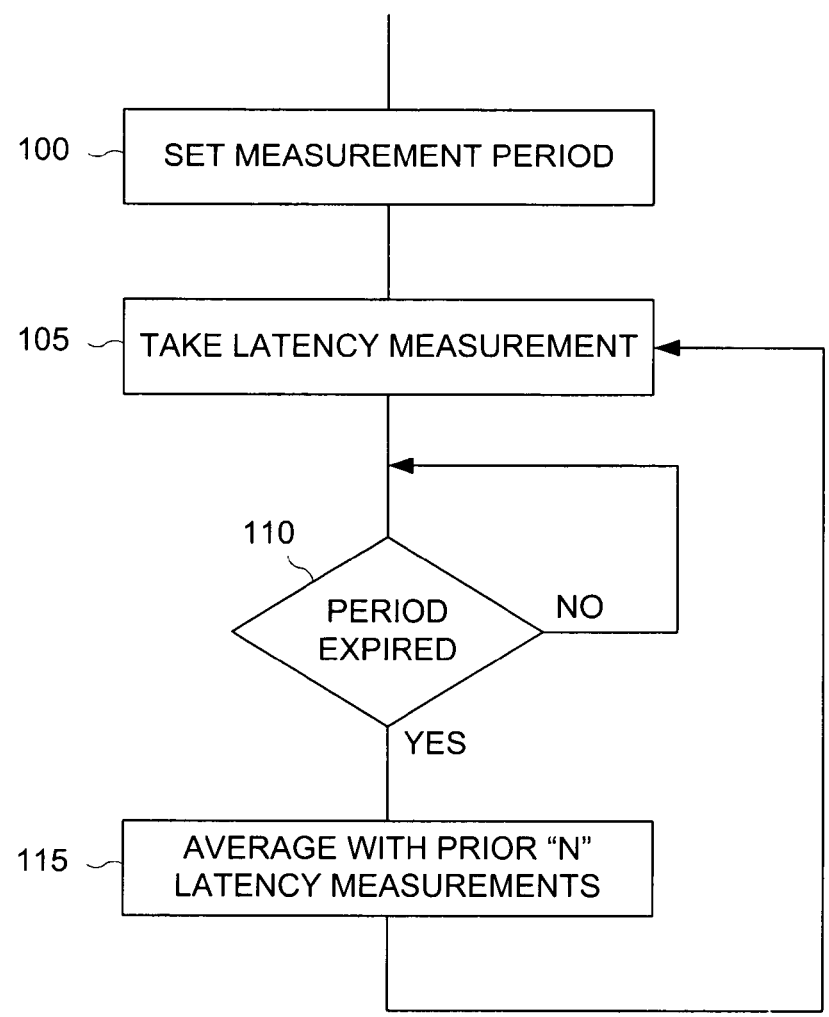
FIG. 4 is a flow diagram that depicts one alternative method for determining communication latency amongst a plurality of reference nodes.

FIG. 4 is a flow diagram that depicts one alternative method for determining communication latency amongst a plurality of reference nodes. A networking infrastructure operates in a dynamic manner. As a result, performance characteristics of a networking infrastructure, including communication latency, can vary widely over time. Accordingly, this alternative method provides for determining communication latency on a periodic basis. For example, communication latency is established by establishing a measurement period (step 100), taking a latency measurement (step 105) and then waiting for the measurement period to expire (step 110). According to one alternative variation of the present method, some quantity of prior latency measurements are averaged together with a current measurement to form a moving average (step 115). The moving average is then used as a metric of communication latency from a first reference node to a second reference node. Additional latency measurements are then made with subsequent expiration of the measurement period.

Figure 5:
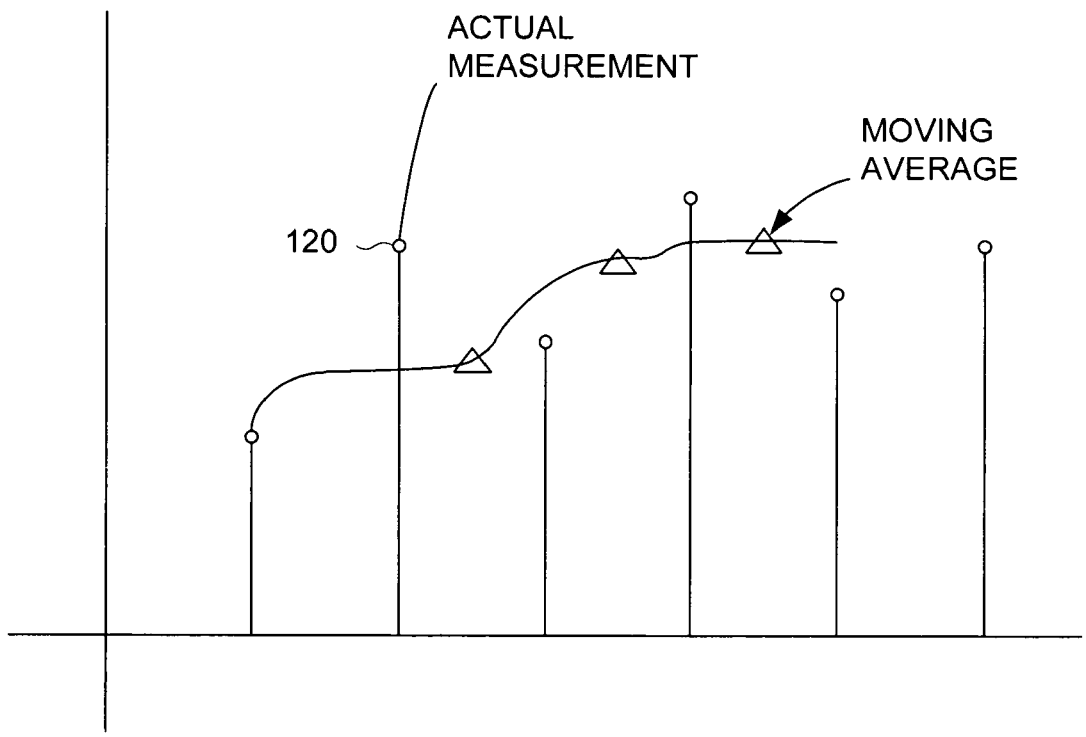
FIG. 5 is a pictorial representation of a moving average.

FIG. 5 is a pictorial representation of a moving average. As depicted in this figure, actual measurements 120 of communication latency can vary dramatically over time. In order to provide a more reasonable estimate of communication latency from a first reference node to a second reference node, a moving average 125 provides a level of filtering so that exceptional measurement values do not skew observations of network infrastructure performance characteristics. For example, a large latency value may be observed at one moment because of a particular anomaly or extraordinary circumstances. The use of a moving average results in a more reasonable approximation in the determination of communication latency from the first reference node to the second reference node.

Figure 6:
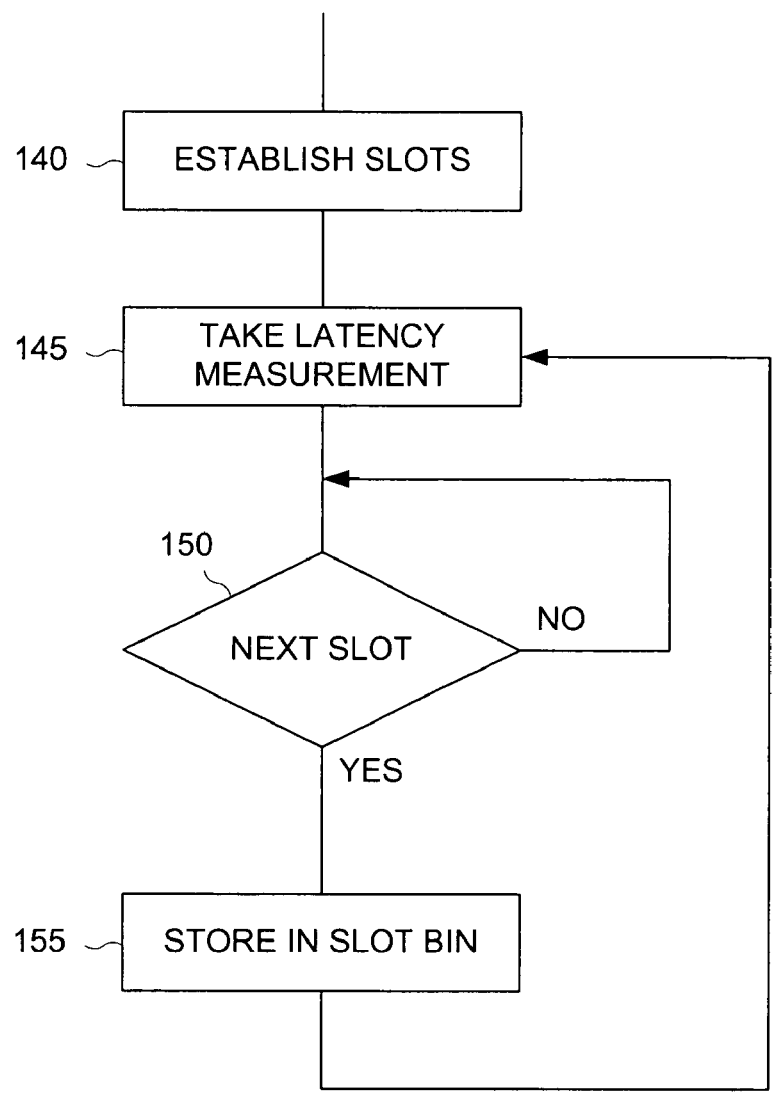
FIG. 6 is a flow diagram that depicts yet another alternative method for determining communication latency amongst the plurality of reference nodes.

FIG. 6 is a flow diagram that depicts yet another alternative method for determining communication latency amongst the plurality of reference nodes. According to this alternative method, communication latency between a first reference node and a second reference node is measured at different time slots, for example different hours in a 24-hour period. Time slots, according to a variation of this method, can be established at 10 minute intervals, hourly or other convenient periods. It should be noted that the present method is not intended to be limited to any particular time slot period. According to this example method, some quantity of time slots is established (step 140). A communications latency measurements is performed (step 145) and is stored according to the time slot (step 155), e.g. in a time slot bin. This continues for each time slot (step 150). The method presented here dwells until the next time slot in time, when a new measurement is made and stored in a corresponding time slot bin.

Figure 7:
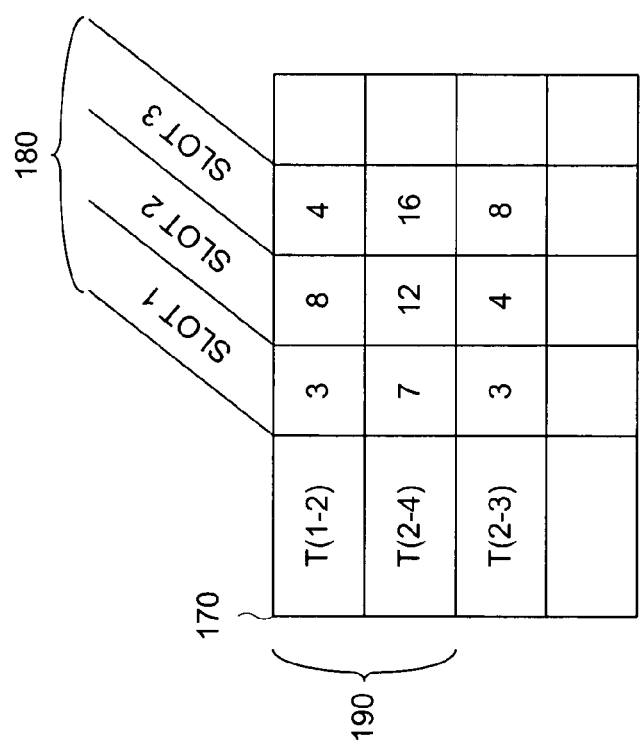
FIG. 7 is a pictorial representation of a table used to store communication latency amongst the plurality of reference nodes according to time slot.

FIG. 7 is a pictorial representation of a table used to store communication latency amongst the plurality of reference nodes according to time slot. According to one example method, communication latency from a first reference node to a second reference node is stored in a table 170. According to one example method, a table 170 is organized into rows and columns. For example, rows 190 in the table 170 may be used to represent latency between a particular first reference node and a particular second reference node according to indices for said reference nodes, e.g. T(1-2). Additional rows 190 in the table 170 can be used to store communication latency between different pairs of reference nodes. Columns 180 in the table can be used to store communication latency between particular pairs of reference nodes at different time slots.

Figure 8:
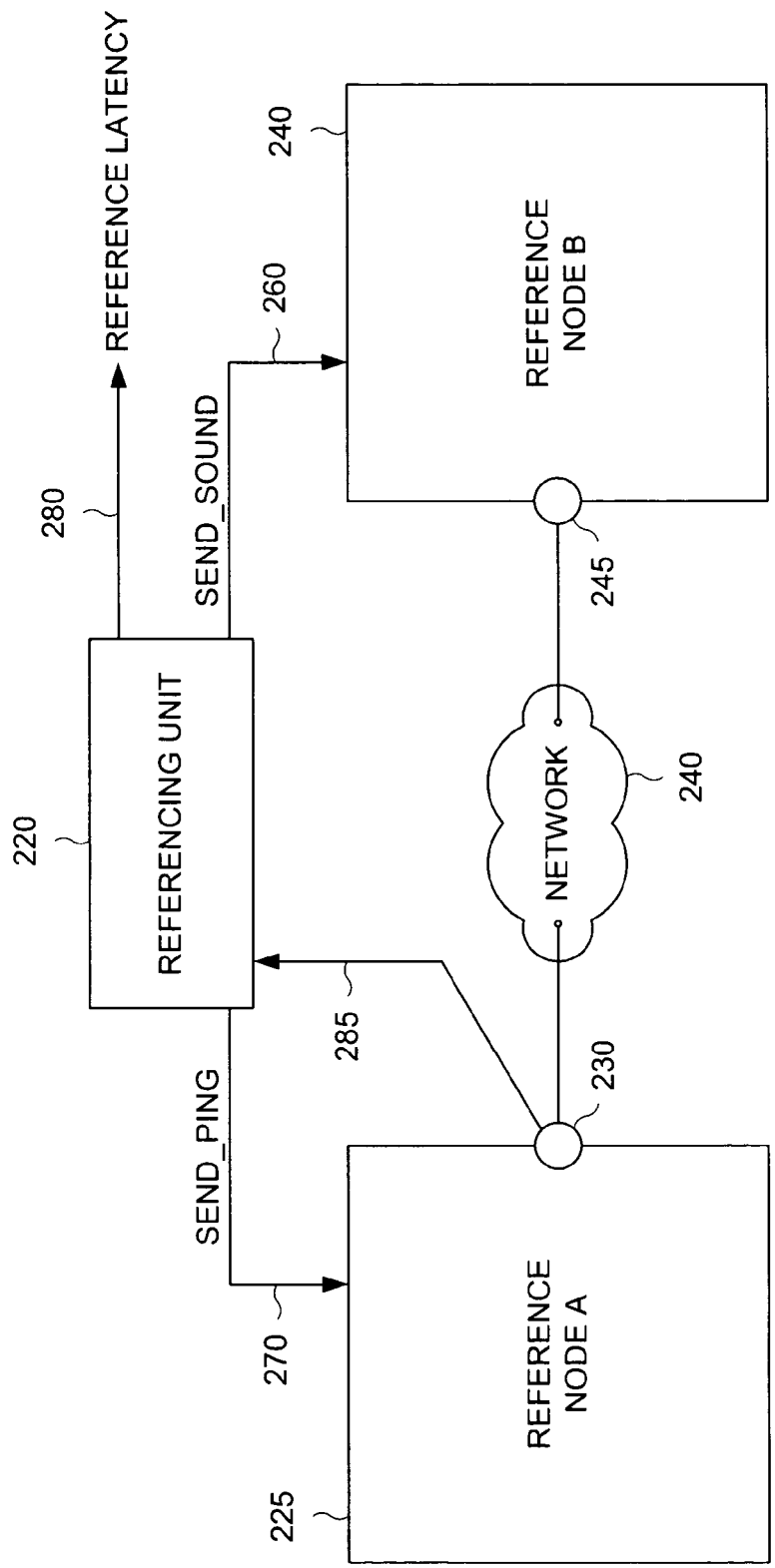
FIGS. 8, 9 and 10 collectively comprise a block diagram that depicts one example embodiment of a system for determining an approximate location of a target node attached to a network.
Figure 9:
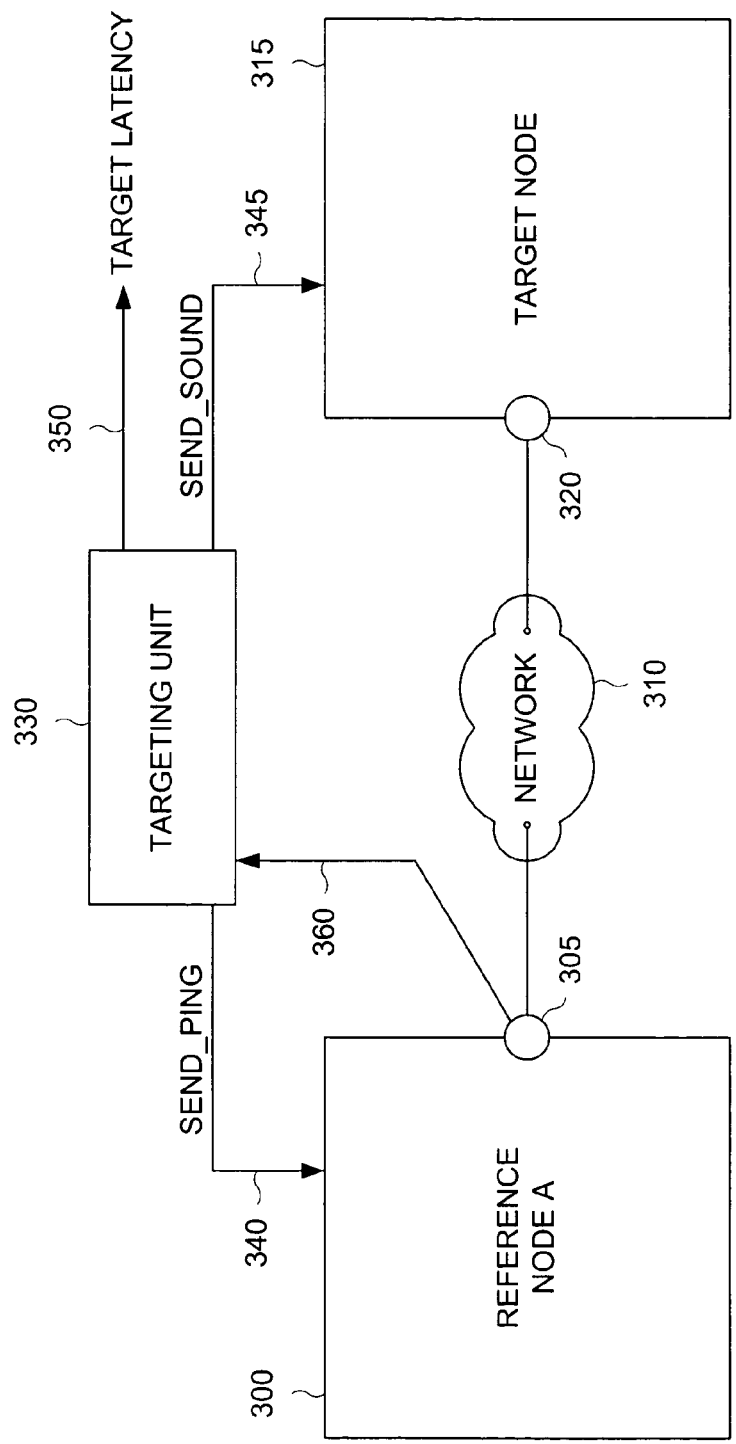
Figure 10:
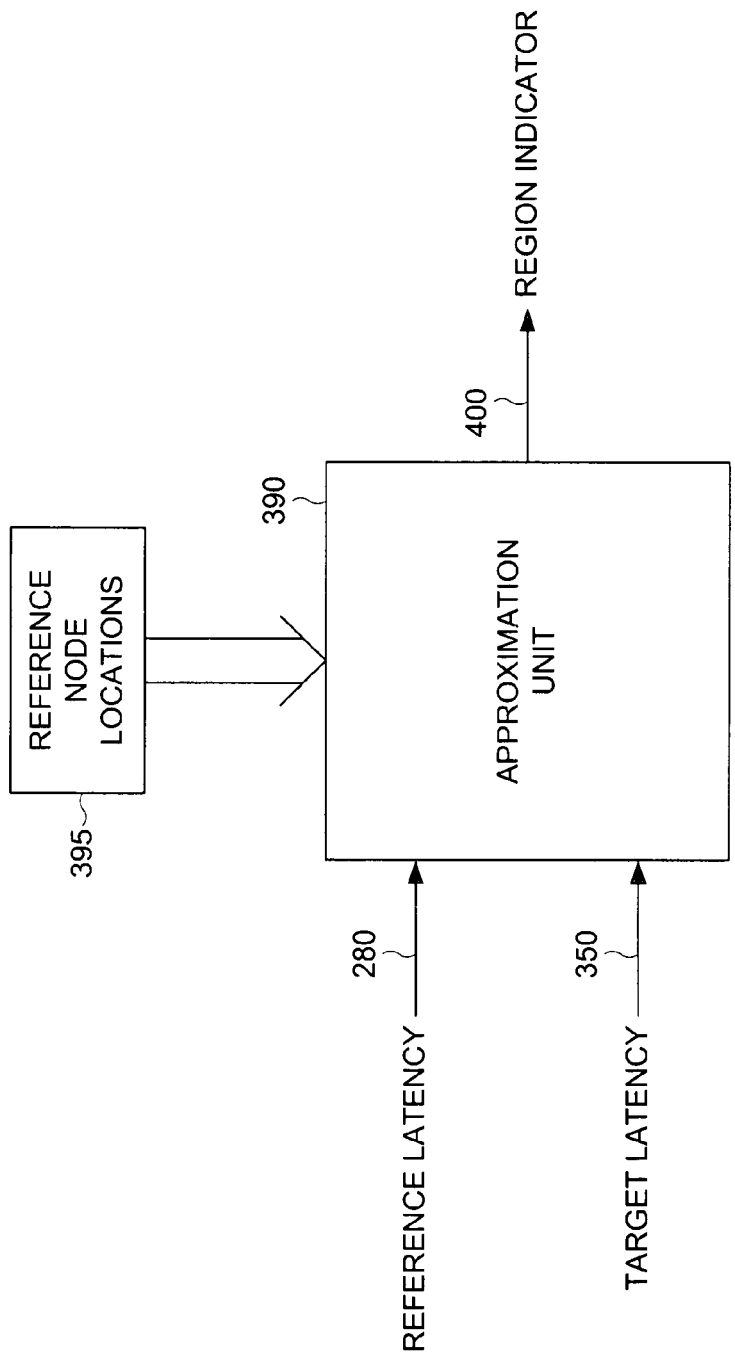

FIGS. 8, 9 and 10 collectively comprise a block diagram that depicts one example embodiment of a system for determining an approximate location of a target node attached to a network. According to this example embodiment, a system for determining an approximate location of a target node attached to a network comprises a referencing unit 220, a targeting unit 330 and an approximation unit 390. The referencing unit 220 of this example embodiment is capable of determining the communication latency amongst a plurality of reference nodes attached to a network 240. The targeting unit 330 is capable of determining the communication latency between one of the reference nodes and the target node. The approximation unit 390 is capable of determining a region within which the target node is located according to the communication latency between the target node and at least one of the reference nodes.

According to one example embodiment, the referencing unit 220 causes a first reference node 225 to dispatch a ping directive to a network 240. Typically, the referencing unit 220 issues a signal 270 to the first reference node 225. In response to this signal 270, the first reference node 225 dispatches a ping directive to the network 240. Generally, the ping directive is addressed to a second reference node 240. The referencing unit 220 perceives the arrival of a response from the second reference node 240. This is accomplished using a monitor interface 285. Where it should be appreciated that, according to an alternative embodiment of a referencing unit 220, the signal 270 issued by the referencing unit 220 comprises a network message conveyed from the referencing unit 220 to the first reference node 225 using the network 240.

According to yet another example embodiment, the referencing unit 220 causes the second reference node 240 to transmit a sounding message to the first reference node 225 using a network 240. Accordingly, the referencing unit 220 issues a signal 260 to the second reference node 240. This signal 260, according to one alternative embodiment of a referencing unit, comprises a message conveyed to the second reference node using the network 240. The second reference node 240 responds to this signal 260 by transmitting a sounding message to the first reference node 225. The referencing unit 220, again using the monitor interface 285, receives the sounding message arriving at the first reference node 225. It should be noted that the sounding message transmitted by the second reference node 240 includes an initial time-to-live value and a time-to-live protocol parameter. The referencing unit 220 uses the time-to-live value and the time-to-live protocol parameter to determine a hop distance between the first and second reference nodes. Based on observation of communication that occurs between the first reference node 225 and the second reference node 240, the referencing unit 220 generates a reference latency 280.

FIG. 9 illustrates that the targeting unit 330 is a variation of the referencing unit 220 and performs functions analogous to those performed by the referencing unit 220. In this case, the targeting unit 330 interacts with a reference node 300 and a target node 315. Accordingly, the targeting unit 330 includes signal generation capability in order to generate a signal 340 that causes a reference node 300 to issue a ping directive to a network 310. The targeting unit 330 further includes a monitor interface 360 for detecting a response from the target node 315 that arrives at the reference node 300 by way of the network 310. Yet another embodiment of the targeting unit 330 includes a signal generator capable of generating a signal 345 that causes the target node 315 to transmit a sounding message that is addressed to the reference node 300 over the network 300. Based on observations of communication between the reference node 300 and the target node 315, the targeting unit 330 generates a target latency 350.

FIG. 10 illustrates that the approximation unit 390 receives a reference latency 280 and a target latency 350 from the referencing unit 220 and the targeting unit 330, respectively. The approximation unit 390 generates a region indicator 400 that is indicative of a region within which the target node lies.

According to one alternative embodiment, locations for one or more reference nodes are received by the approximation unit 390 from a lookup table 395.

Figure 11:
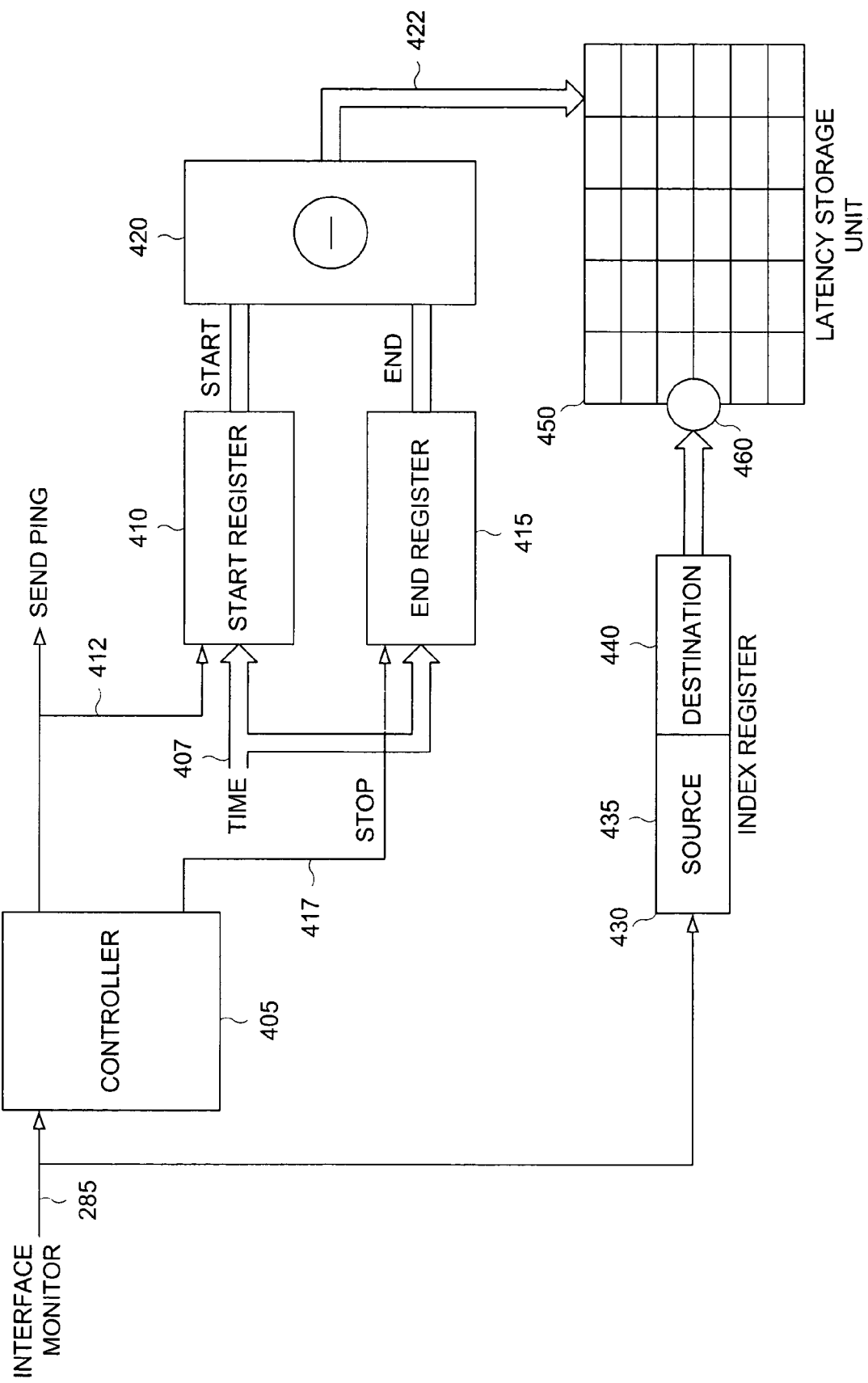
FIG. 11 is a block diagram that depicts one alternative example embodiment of a referencing unit.

FIG. 11 is a block diagram that depicts one alternative example embodiment of a referencing unit 220. It should be noted that this block diagram and discussion thereof is also applicable to one alternative embodiment of a targeting unit 330. According to this alternative embodiment, a referencing unit (or a targeting unit) comprises a controller that issues a SEND_PING signal 412. A time value 407 is captured by a start register 400 according to the SEND_PING signal 412. The start register 400 is included in this alternative embodiment of a referencing unit. Also included in this alternative embodiment of a reference unit is an end register 415. The end register 415 captures a time value according to a STOP signal 417 that is also generated by the controller 405. The controller 405 generates the STOP signal 417 when it detects the arrival of a response to a ping message that a first reference node transmits to a second reference node in response to the SEND_PING signal 412. The SEND_PING signal 412 is conveyed to a first reference node 225 by the referencing unit 220 as signal 270 in FIG. 9. In FIG. 10, the targeting unit 330 conveys the SEND_PING signal 412 as signal 340 to a reference node 300.

This example embodiment of a referencing unit further includes an index register 430 that captures as an index source 435 and a destination 440 indicators for a ping response received on the monitor interface 285. The index 460 is used to select a storage location in a latency storage unit 450 also included in this illustrative embodiment of a referencing unit. This illustrative embodiment of a referencing unit further comprises a differencing unit 420 that receives start and end values from the start register 410 and the end register 415, respectively. The difference 422 between the values received from the start register 410 and the end register 415 is stored in the latency storage unit 450 according to the index 460 provided by the index register 430.

Figure 12:
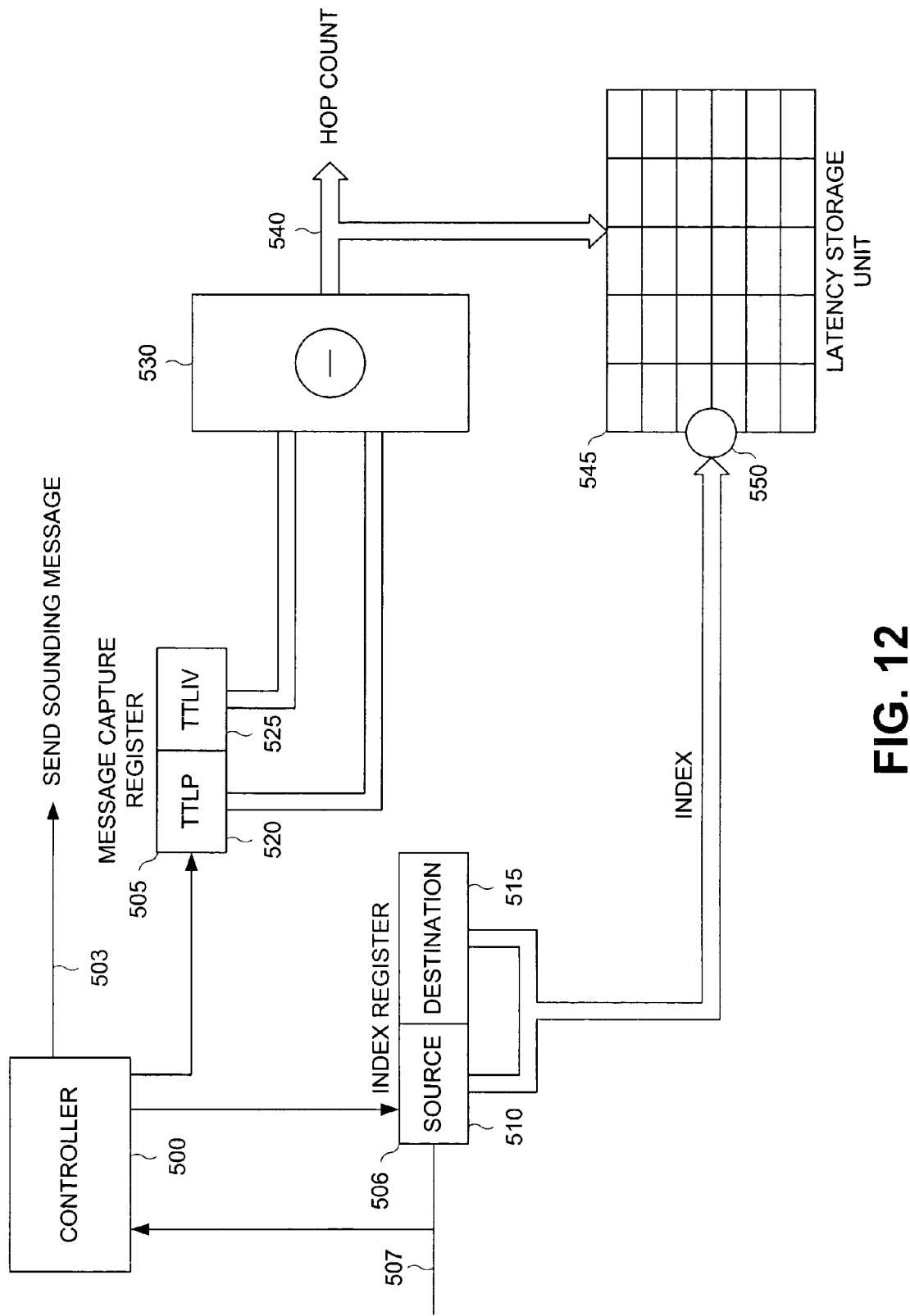
FIG. 12 is a block diagram that depicts yet another alternative illustrative embodiment of a referencing unit.

FIG. 12 is a block diagram that depicts yet another alternative illustrative embodiment of a referencing unit. This block diagram can also be used to describe another alternative embodiment of a targeting unit. According to this alternative embodiment, a referencing unit (or a targeting unit) comprises a controller 500 that causes a reference node to transmit a sounding message. The controller 500 generates a signal called SEND_SOUND 503. The SEND_SOUND signal 503, as depicted in FIG. 8, is conveyed to a second reference node 240 by a referencing unit 220 as signal 260. As illustrated in FIG. 9, a targeting unit 330 conveys the SEND_SOUND signal 503 to a target node 315 as signal 345.

The controller 500 of this alternative embodiment of a referencing unit uses a monitor interface 507 to receive a sounding message sent by the second reference node 240 as it arrives at a first reference node 225 (cf. FIG. 8). At the direction of the controller 500, a sounding message arriving at the monitor interface 507 is captured in a message capture register 505 included in this embodiment of a referencing unit (or targeting unit). The message capture register 505 captures a time-to-live protocol parameter TTLP 520 and an initial time-to-live value TTLIV 525 from the sounding message received by way of the monitor interface 507. This example embodiment of a referencing unit further comprises a differencing unit 530 that generates a hop-distance 540 according to the difference between the time-to-live protocol parameter and the initial time-to-live value stored in the message capture register 505.

This alternative illustrative embodiment of a referencing unit further comprises a latency storage unit 545. The latency storage unit 545 is index 550 by a value received from an index register 506 also included in this embodiment of the referencing unit. The index register 506 captures source 510 and destination 515 addresses from the sounding message received at the monitor interface 507. Accordingly, these are used as an index into the latency storage unit 545 for storage of a hop-value 540 generated by the differencing unit 530.

Figure 13:
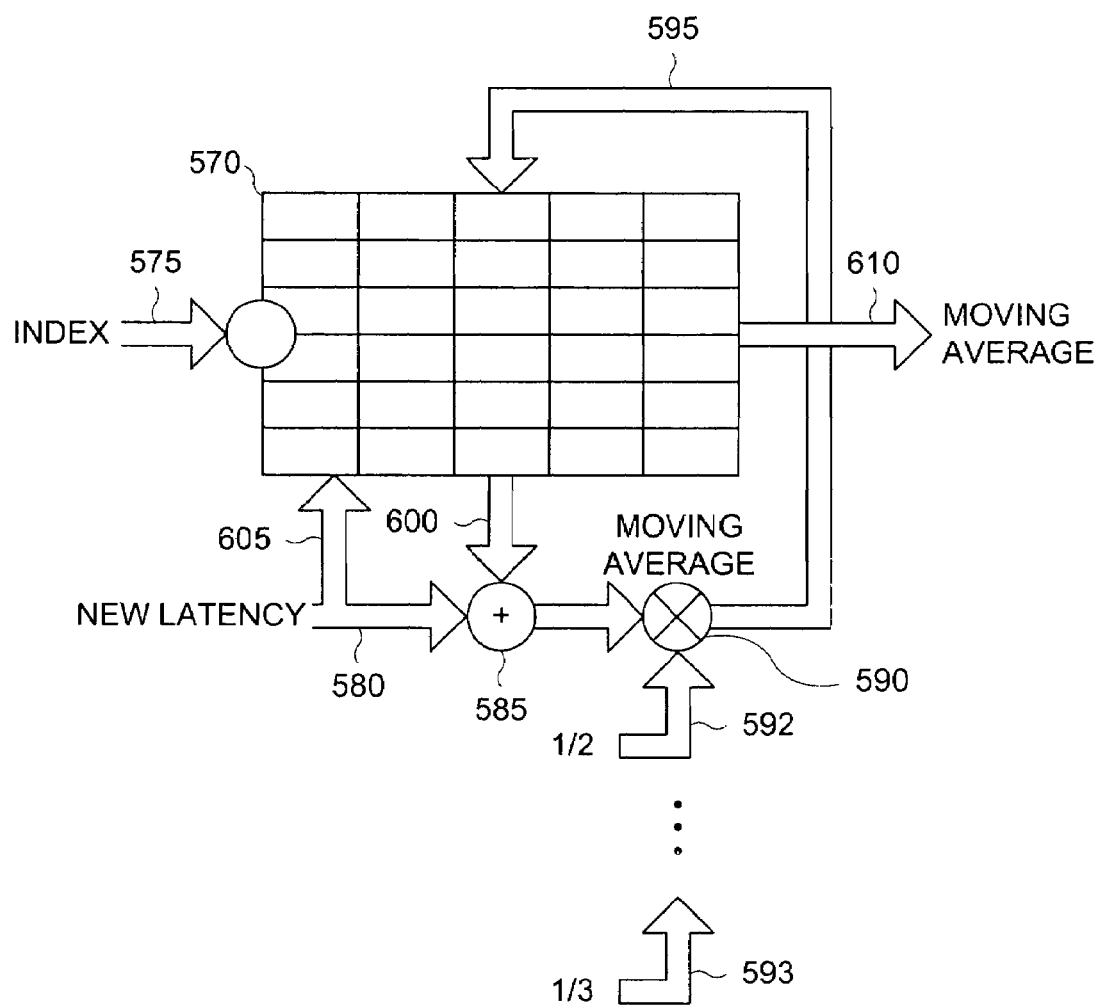
FIG. 13 is a block diagram that depicts a latency storage unit augmented with a moving average mechanism.

FIG. 13 is a block diagram that depicts a latency storage unit augmented with a moving average mechanism. According to one alternative embodiment, a referencing unit further comprises a latency storage unit 570, an adder 585 and a multiplier 590. According to this alternative embodiment, the multiplier 590 is configured to multiply by the inverse of a previous sample count. According to one alternative example embodiment, the multiplier is configured to multiply an output from the adder 585 by $2^{-1}$ 592. According to yet another alternative example embodiment, the multiplier is configured to multiply an output from the adder 585 by $3^{-1}$ 593. It should be noted that these multiplicands are only examples and are not intended to limit the scope of the appended claims.

According to this alternative embodiment, the latency storage unit 570 stores a plurality of previous latency samples. As a new latency value is received 580, it is independently stored 605 in the latency storage unit 570. One or more previous values are retrieved 600 from the latency storage unit 570 and added to the new value by the adder 585. The output of the adder 585 is then multiplied by the inverse of (in effect dividing by) the quantity of previous samples 600 contributing to the sum generated by the adder 585. The product 595 produced by the multiplier 590 is then stored in the latency storage unit 570. Storage of values in the latency storage unit 570 is accomplished according to an index 575 comprising a source and a destination node indicator (e.g. network addresses for a source and destination node). This index 575 is also used to select a moving average of a reference communication latency between two nodes attached to the network.

Figure 14:
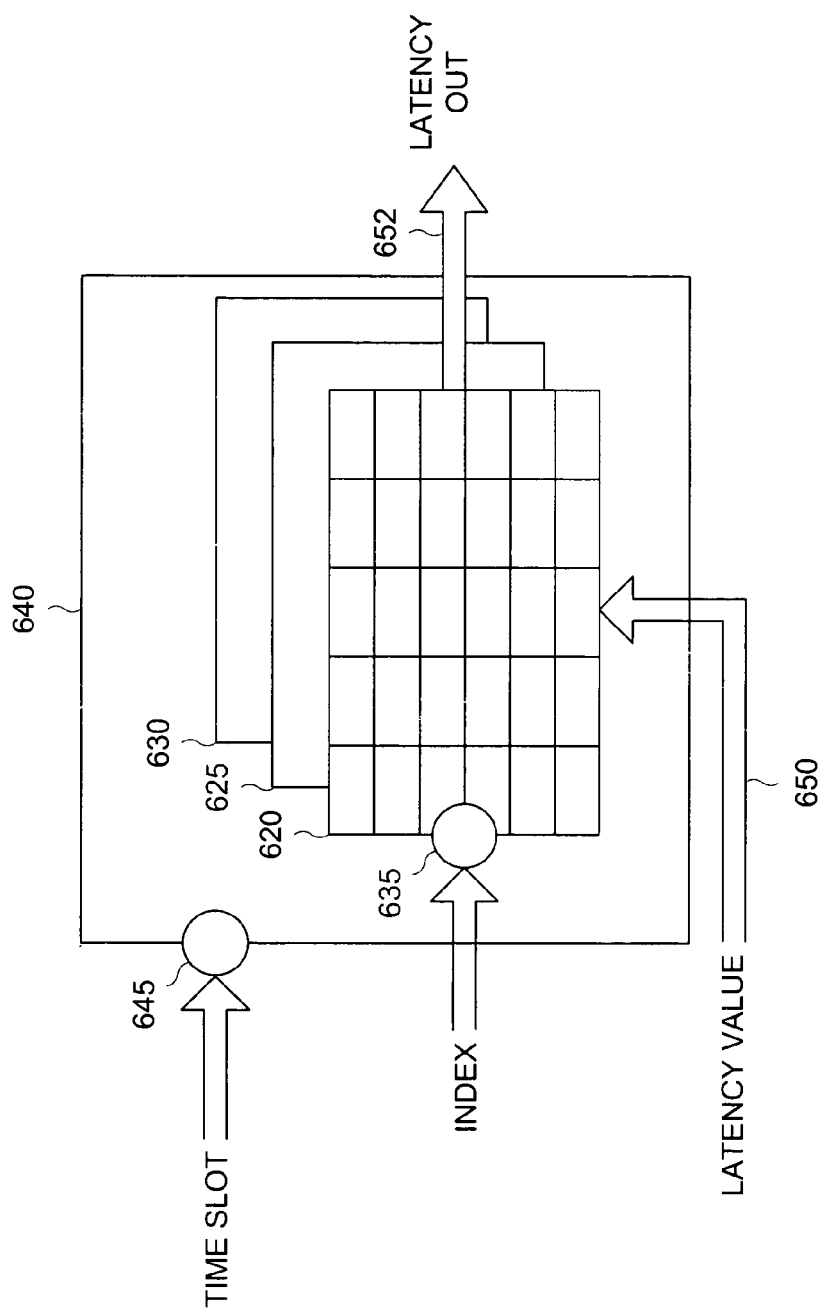
FIG. 14 is a block diagram that depicts yet another alternative embodiment of a referencing unit that manages communication latency amongst a plurality of reference nodes according to time slot.

FIG. 14 is a block diagram that depicts yet another alternative embodiment of a referencing unit that manages communication latency amongst a plurality of reference nodes according to time slot. According to this alternative embodiment, the latency storage unit 640 in a referencing unit comprises a plurality of tables (e.g. 620, 625 and 630), each of which stores a communication latency from one reference node to another. These tables are indexed according to an index 635 that comprises indicators for source and destination nodes (e.g. reference node indexes as described supra). In order to store communication latencies for particular pairs of reference nodes, this alternative embodiment uses a time-slot index 645 to select one of the tables used to store communication latencies amongst particular pairs of reference nodes. A latency value 650 is presented to or retrieved from 652 the latency storage unit 640 of this alternative embodiment contemporaneously with the presentation to the latency storage unit 640 of a node pair index 635 and a time-slot index 645.

Figure 15:
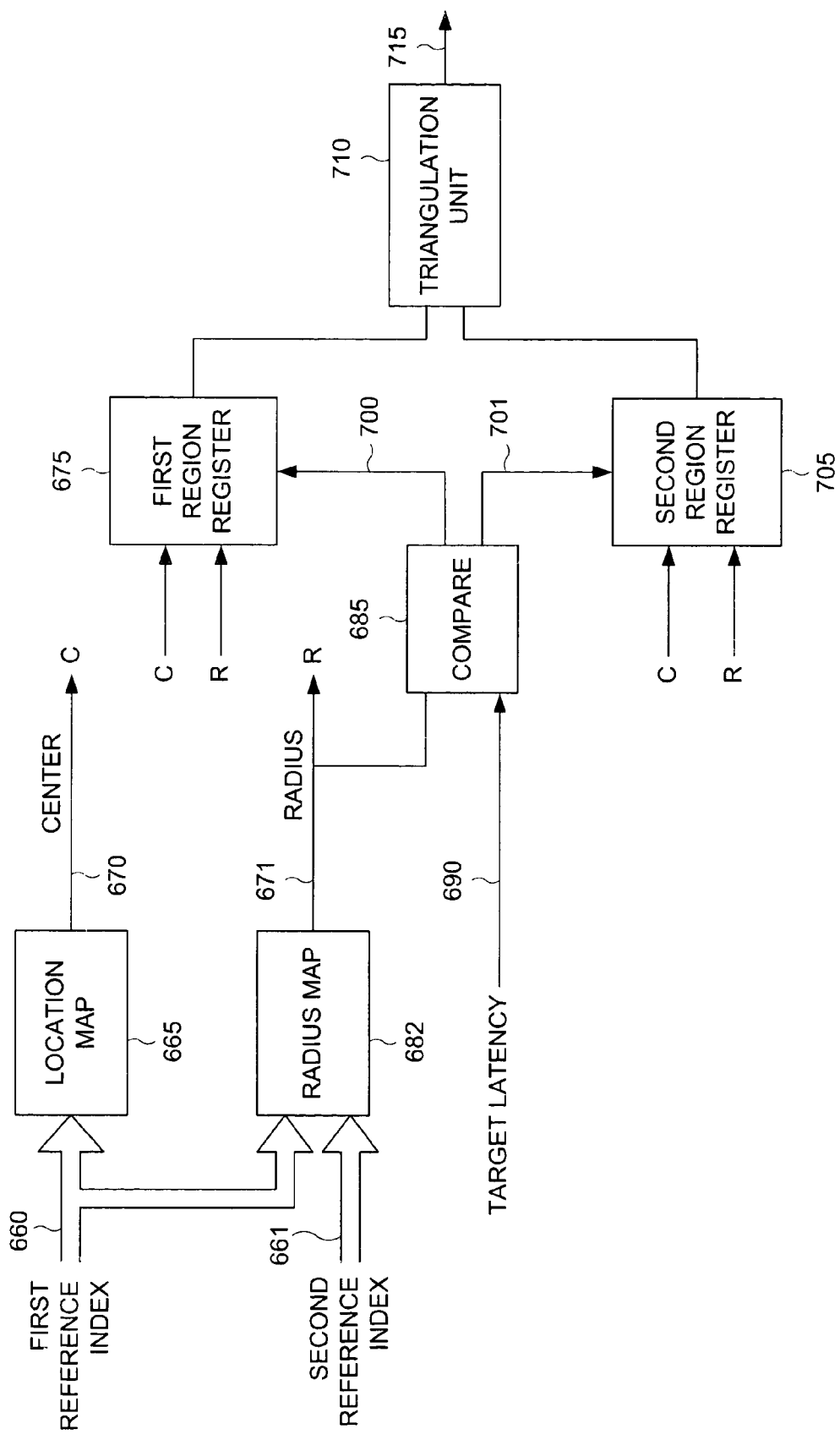
FIG. 15 is a block diagram that depicts one alternative example structure of an approximation unit.

FIG. 15 is a block diagram that depicts one alternative example structure of an approximation unit. According to this alternative embodiment, an approximation unit 390 comprises a location map 665, a radius comparator 685 and a first region register 675. According to this alternative embodiment, the location map 665 receives an index for a first reference node 660 and converts this index to a center point 670. It should be noted that the location map 665 can have stored therein center locations for one or more reference nodes, each identified by an index. Using values stored in a latency storage unit included in a referencing unit 220, the communication latency between the reference node indexed by the reference index 660 and another reference node is compared to a target latency 690. This comparison occurs until a reference node having a communication latency greater than the target latency is discovered. The comparison is accomplished by the radius comparator 685. If the comparison indicates that the target latency is less that the reference latency from the first reference node (i.e. a node associated with the first reference index 660) to the second reference node (i.e. a node associated with the second reference index 661), the radius comparator 685 generates a STORE signal 700.

The index of this second reference node 661 is used in conjunction with the index of the first reference node 661 as an index into a radius map 682, also included in one alternative embodiment. The radius map 682 provides a radius 671, which represents the geographic distance between the first reference node and the second reference node associated with the first and second reference node indexes (660, 661). The STORE signal 700 is used in this alternative embodiment to store a center point 670 for a node associated with the first reference index 660 and a radius 671 from that node out to a node associated with the second reference index 661. The radius value is provided by the radius map 682 according to the indices for the first and second reference nodes (660, 661).

Figure 16:
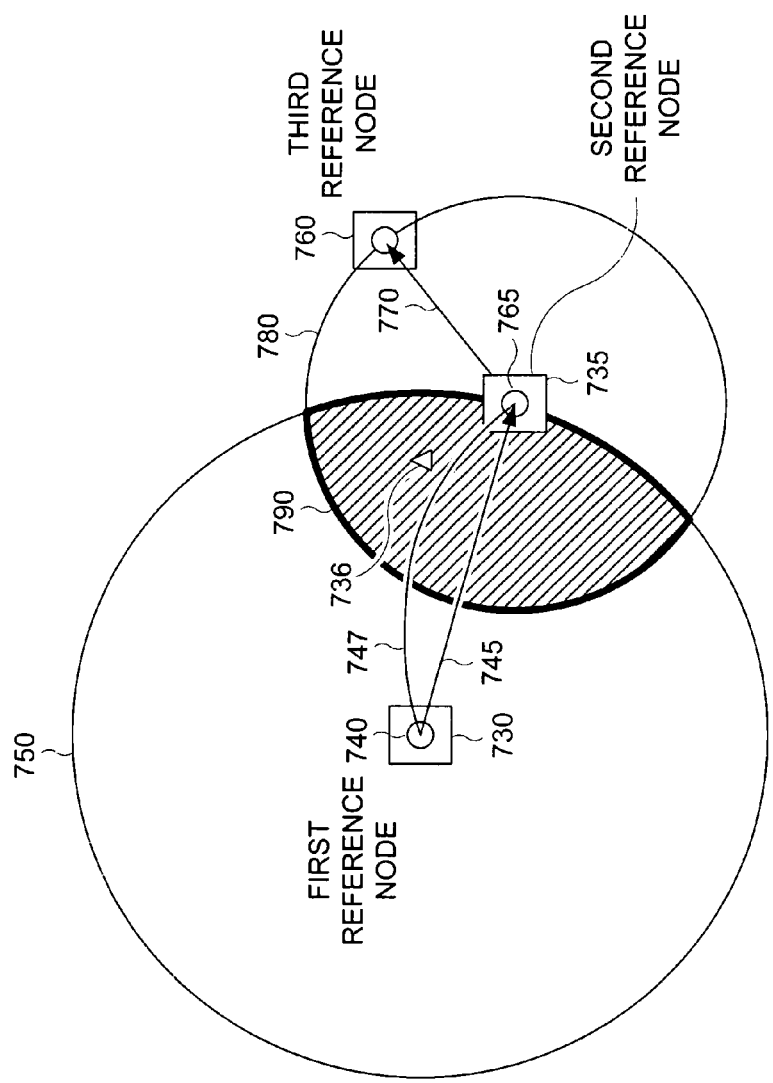
FIG. 16 is a pictorial representation of a geographic region provided by one alternative embodiment of an approximation unit.

FIG. 16 is a pictorial representation of a geographic region provided by one alternative embodiment of an approximation unit. According to one illustrative use case, a first reference node 730 is selected and the geographic center point 740 of the node is provided by a lookup table (i.e. a location map cf. FIG. 15). When a second reference node 735 is discovered that exhibits a communication latency 747 to the first reference node 730 that is greater than a communication latency to a target node 736 from the first reference node 730, a substantially circular geographic region 750 having a center point 740 according to the geographic location of the first reference node 730 and a radius essentially equal to the geographic distance 745 between the first reference node 730 and the second reference node 735. Accordingly, the target node 736 can be approximated as being with the geographic confines of the substantially circular geographic region 750.

FIG. 15 further illustrates that, according to one alternative example embodiment, an approximation unit further comprises a second region register 705 and a triangulation unit 710. According to this alternative embodiment, the location map 665 is used to determine a center for a second reference node. A target latency is determined from the second reference node and is used as an input to the radius comparator 685. One or more other reference nodes are selected until a reference node is discovered that exhibits a communication latency to the second reference node is less than the target latency from the second reference node. A STORE2 signal 701 is directed to the second region register 705, which stores the center point of the second reference node and a radius from the second reference node out to the discovered reference node. It should be noted that this radius value is provided by the radius map 682 according to an index for the second reference node and an index for the discovered reference node. It should be further noted that the discovered reference could in fact be the first reference node or some other third reference node. The triangulation unit 710 generates a region descriptor for an approximate location for the target node according to a union of the two substantially circular regions stored in the first and second region registers (675, 705).

FIG. 16 further illustrates that, according to yet another illustration, the approximation unit generates a region according to a union of two substantially circular regions. Accordingly, a second circular region 780 is identified by a second region register in the approximation unit. The second circular region 780 is defined according to a center point 765 substantially coincident with the geographic location of a second reference node 735. The radius of the second region, although shown as the distance from the second reference node to a third reference node 760, could be the distance from the second reference node 735 back to the first reference node 730. The triangulation unit 710 included in the approximation unit identifies a region within which a target node 736 lies by performing a union function of the two substantially circular regions 750 and 780 resulting in a region identified as a target region 790. Accordingly, the target node 736 can be approximated to lie in the target region 790.

While the present method and system have been described in terms of several alternative methods and embodiments, it is contemplated that alternatives, modifications, permutations, and equivalents thereof will become apparent to those skilled in the art upon a reading of the specification and study of the drawings. It is therefore intended that the true spirit and scope of the appended claims include all such alternatives, modifications, permutations, and equivalents.

What is claimed is:

1. A method for determining an approximate location of a target node communicatively coupled to a plurality of reference nodes over a computer network configured to support an IP communications protocol, the method comprising:

sending packets, formatted to support the IP communications protocol, between the reference nodes to determine reference latencies between each reference node and each of the other plurality of reference nodes, each reference latency including a measurement of communication latency between a specified reference node and another reference node from the plurality of reference nodes and excluding any measurement of communication latency between the target node and any one of the plurality of reference nodes;

updating a table of latency information on a periodically scheduled basis to maintain a record including a plurality of entries of the reference latencies between each reference node and each other reference node from the plurality of reference nodes, the entries being collected over a designated period of time;

measuring, from packets formatted to support the IP communications protocol and sent between the target node and the reference nodes, target latencies between the target node and a subset of the reference nodes, each target latency including a measurement of communication latency between the target node and a specified reference node; and comparing the target latencies to identify at least three reference nodes having close proximity to the target node; and triangulating reference latencies associated with the at least three reference nodes to approximate a geographic region within which the target node is located.

2. The method of claim 1, wherein the sending packets comprises:

noting a start time;

conveying a ping directive to the computer network from a first reference node to a second reference node;

noting an end time when a response to the ping directive is received; and determining the difference between the start time and the end time.

3. The method of claim 1, wherein the sending packets comprises:
- transmitting a sounding message from a first reference node, wherein the sounding message includes a time-to-live protocol parameter and an initial time-to-live value;
- receiving the sounding message in a second reference node; and
- determining a hop-distance according to a time-to-live value stored in the protocol parameter and the initial time-to-live value included in the received sounding message.

4. The method of claim 1, wherein the sending packets comprises determining communication latencies amongst a plurality of reference nodes on a periodic basis and generating a moving average according to the periodic communication latency determinations.

5. The method of claim 1, wherein the sending packets comprises determining communication latencies amongst a plurality of reference nodes for a plurality of time-slots.

6. The method of claim 1, wherein the measuring target latencies comprises:
- noting a start time;
- conveying a ping directive to the computer network from a first reference node to the target node;
- noting an end time when a response to the ping directive is received; and
- determining the difference between the start time and the end time.

7. The method of claim 1, wherein the measuring target latencies comprises:
- transmitting a sounding message from the target node, wherein the sounding message includes a time-to-live protocol parameter and an initial time-to-live value;
- receiving the sounding message in a reference node; and
- determining a hop-distance according to a time-to-live value stored in the protocol parameter and the initial time-to-live value included in the received sounding message.

8. The method of claim 1, wherein the comparing the target latencies comprises identifying a first region surrounding a first reference node out to a latency distance to a second reference node when the latency distance between the target node and the first reference node is less than the latency distance between the first reference node and the second reference node.

9. The method of claim 8, wherein the triangulating reference latencies comprises identifying a union of the first identified region and a region surrounding the second reference node out to a latency distance to either the first reference node or a third reference node when the latency distance between the target node and either the first reference node or the third reference node is less than the latency distance between the second node and either the first reference node or the third reference node.

10. A system for determining an approximate location of a target node communicatively coupled to a plurality of reference nodes over a computer network configured to support an IP communications protocol, the system comprising:
- a referencing unit operably configured to cause the reference nodes to send packets, formatted to support the IP communications protocol, between the reference nodes to determine reference latencies between each reference node and each of the other plurality of reference nodes, wherein each reference latency includes a measurement of communication latency between a specified reference node and another reference node from the plurality of reference nodes and excludes any measurement of communication latency between the target node and any one of the plurality of reference nodes;
- a latency memory controller operably configured to update a latency storage medium including latency information on a periodically scheduled basis to maintain a record including a plurality of entries of the reference latencies between each reference node and each other reference node from the plurality of reference nodes, wherein the latency memory controller is further configured to collect the entries over a designated period of time;
- a targeting unit operably configured to determine, from packets formatted to support the IP communications protocol and sent between the target node and the reference nodes, target latencies between the target node and a subset of the reference nodes, wherein each target latency includes a measurement of communication latency between the target node and a specified reference node; and
- an approximation unit operably configured to triangulate reference latencies associated with at least three reference nodes to approximate a geographic region within which the target node is located, wherein the approximation unit comprises,
- a latency comparator operably configured to compare the target latencies to identify the at least three reference nodes based on close proximity to the target node.

11. The system of claim 10, wherein the referencing unit comprises:
- a controller that issues a send ping signal and issues a stop signal when it recognizes a ping response;
- a start register that captures a start time according to the send ping signal;
- an end register that captures an end time according to the stop signal;
- an index register that captures source and destination indicators for a ping;
- a latency differencing unit that generates a latency value according to the difference between a value stored in the start register and a value stored in the end register; and
- a latency storage unit that stores the generated latency value in a location according to an index stored in the index register.

12. The system of claim 10, wherein the referencing unit comprises:
- a controller that causes a first reference node to transmit a sounding message;
- a message capture register that captures a time-to-live protocol parameter and an initial time-to-live value from the sounding message as it arrives at a second reference node;
- an index register that stores an index according to a source and destination of the sounding message arriving at the second reference node;
- a differencing unit that generates a hop-distance according to the difference between the time-to-live protocol parameter and an initial time-to-live value; and
- a latency storage unit that stores the generated hop-distance in a location according to an index stored in the index register.

13. The system of claim 10, wherein the referencing unit comprises:
- a latency storage unit capable of storing one or more values indexed according to addresses for a first reference node and a second reference node;
- a summing unit capable of adding a current latency value with one or more values retrieved from the latency storage unit according to an index;

a multiplier capable of multiplying an output from the summing unit by an inverse of the sum of one plus the quantity of values retrieved from the latency storage unit, wherein the output of the multiplier is stored in the latency storage unit according to the index.

14. The system of claim 10, wherein the referencing unit comprises a latency storage unit capable of storing one or more values indexed according to addresses for a first reference node and a second reference node and according to a time-slot indicator.

15. The system of claim 10, wherein the targeting unit comprises:
- a controller that issues a send ping signal and issues a stop signal when it recognizes a ping response;
- a start register that captures a start time according to the send ping signal;
- an end register that captures an end time according to the stop signal;
- an index register that captures source and destination indicators for a ping;
- a latency differencing unit that generates a latency value according to the difference between a value stored in the start register and a value stored in the end register; and
- a latency storage unit that stores the generated latency value in a location according to an index stored in the index register.

16. The system of claim 10, wherein the targeting unit comprises:
- a controller that causes the target node to transmit a sounding message;
- a message capture register that captures a time-to-live protocol parameter and an initial time-to-live value from the sounding message as it arrives at a reference node;
- an index register that stores an index according to a source and destination of the sounding message arriving at the reference node;
- a differencing unit that generates a hop-distance according to the difference between the time-to-live protocol parameter and an initial time-to-live value; and
- a latency storage unit that stores the generated hop-distance in a location according to an index stored in the index register.

17. The system of claim 10, wherein the approximation unit comprises:
- a location map that transforms a reference node index to a geographic location;
- a radius comparator that generates a first capture signal when a radius from a first reference node to a second reference node is greater than the radius from the first reference node to the target node; and
- a first region register that stores a geographic location of the first reference node according to the first capture signal.

18. The system of claim 17, wherein the radius comparator generates a second capture signal when a radius from a second reference node to either the first reference node or a third reference node is greater than the radius from the second reference node to the target node, the system comprising:
- a second region register that stores a geographic location for the second node according to the second capture signal; and
- a triangulation unit that generates an approximate location for the target node according to a location stored in the first and second region registers.

* * * * *